No. 644,636. Patented Mar. 6, 1900.
I. REES.
PEDAL AND CRANK PIN FOR CYCLES.
(Application filed Nov. 6, 1897.)

(No Model.) 3 Sheets—Sheet 1.

Witnesses.
Robt A. Blake.
R. A. Smith.

Inventor.
Ivor Rees,
by Henry H. Leigh
Attorney.

No. 644,636. Patented Mar. 6, 1900.
I. REES.
PEDAL AND CRANK PIN FOR CYCLES.
(Application filed Nov. 6, 1897.)
(No Model.) 3 Sheets—Sheet 2.

Witnesses.
Robt. A. Blake.
R. A. Smith.

Inventor.
Ivor Rees,
by Henry H. Leigh
Attorney.

No. 644,636. Patented Mar. 6, 1900.
I. REES.
PEDAL AND CRANK PIN FOR CYCLES.
(Application filed Nov. 6, 1897.)

(No Model.) 3 Sheets—Sheet 3.

Witnesses.
Robt. A. Blake.
R. A. Smith

Inventor.
Ivor Rees,
by Henry H. Leigh
Attorney.

UNITED STATES PATENT OFFICE.

IVOR REES, OF SULLY, ENGLAND.

PEDAL AND CRANK PIN FOR CYCLES.

SPECIFICATION forming part of Letters Patent No. 644,636, dated March 6, 1900.

Application filed November 6, 1897. Serial No. 657,640. (No model.)

*To all whom it may concern:*

Be it known that I, IVOR REES, a subject of the Queen of the United Kingdom of Great Britain and Ireland, residing at Sully House, Sully, near Cardiff, in the county of Glamorgan, England, have invented a new and useful Improved Pedal and Crank Pin for Cycles, (for which I have obtained the following Patent: Great Britain and Ireland, No. 16,809, dated July 13, 1897;) and I do hereby declare that the following is a full, clear, and exact description of the invention, reference being made to the accompanying drawings, which are to be taken as part of this specification and read therewith, and one which will enable others skilled in the art to which it appertains to make and use the same.

This invention relates to an improved construction of pedal and crank pin for cycles.

Figure 1:
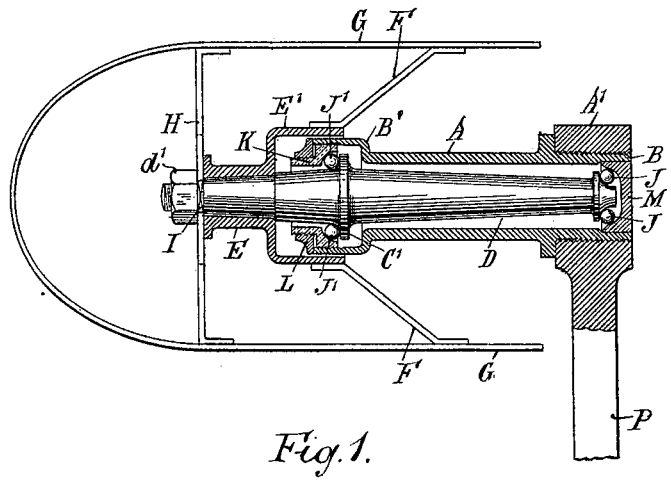
Figure 2:
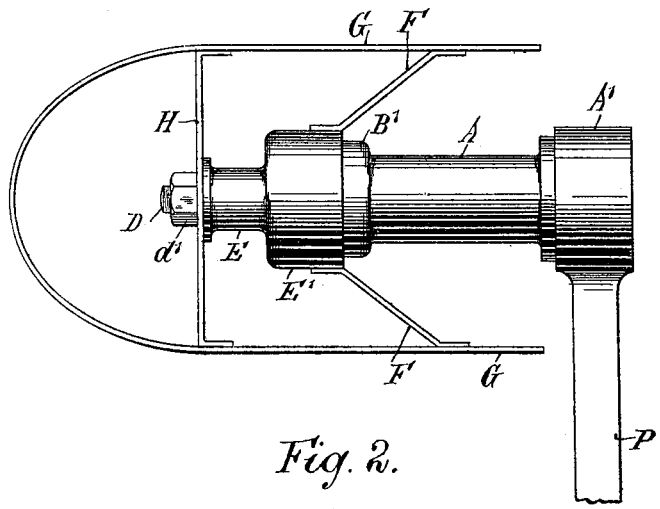
Figure 3:
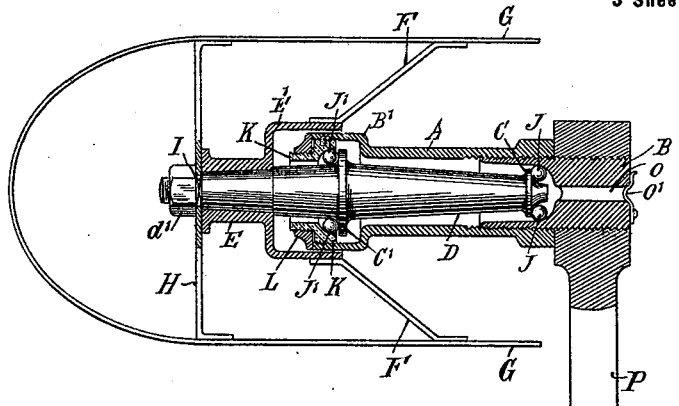
Figure 4:
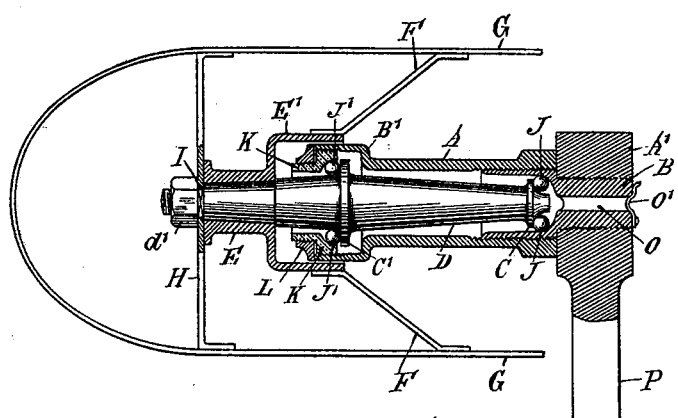
Figure 5:
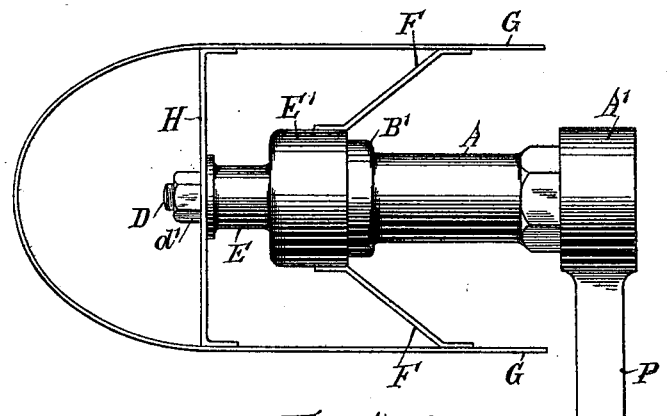
Figure 7:
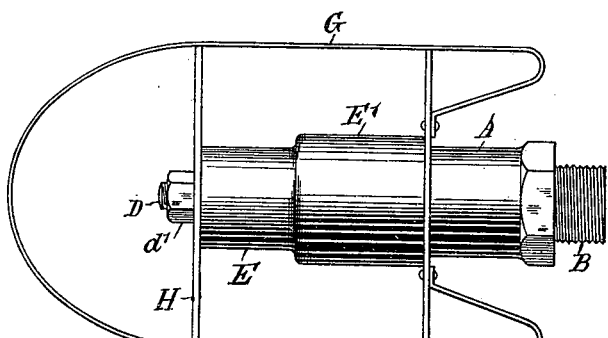
Figures 6, 8:
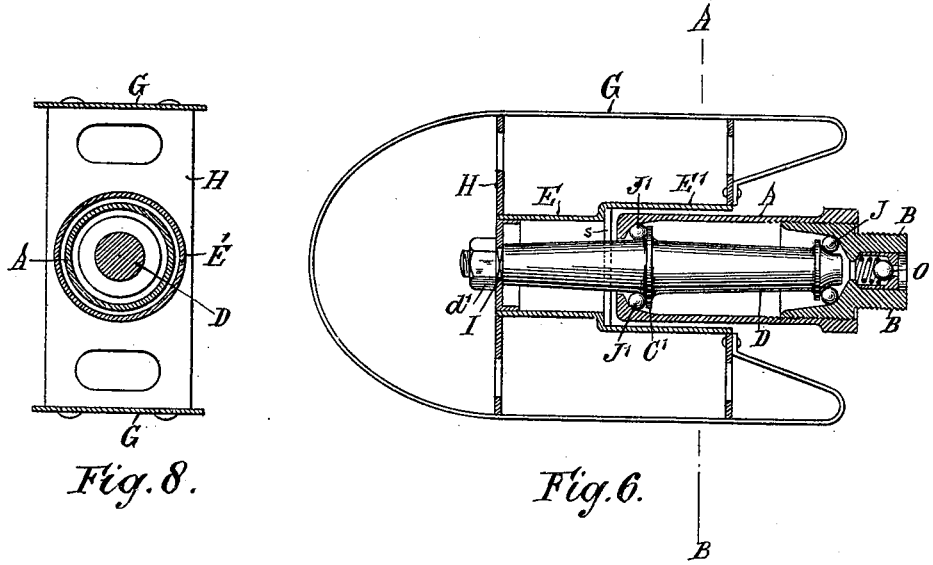

According to my invention, which I will now proceed to describe in detail with reference to the accompanying sheet of drawings, forming part of said description, Figure 1 is a sectional plan view of my invention. Fig. 2 is a plan of Fig. 1. Figs. 3 and 4 are sectional plan views illustrating slight modifications, and Fig. 5 is a plan of Figs. 3 and 4. Fig. 6 is a sectional plan of a modification of my invention. Fig. 7 is a plan of Fig. 6. Fig. 8 is a sectional elevation of Fig. 6, taken on the line A B.

Similar reference-letters denote corresponding parts throughout all the views.

Screwed into the eye of the crank end A' is a hollow tubular crank-pin A, the free end B' of which extends to about the center of the pedal, the portion B of the said crank-pin which is screwed into the crank-eye A' being either integral with the said pin, as shown in Fig. 1, or a separate piece screwed into the end thereof, as shown in Figs. 3 and 4. In the former case the end B of the crank-pin A is closed in by means of a fixed hardened-steel cone-bearing M, while in the latter case the said separate piece B will be of hardened steel and form the bearing cup or cone at that end to receive the antifriction-balls J J, the operations of screwing it into the crank end and adjusting it being effected at one and the same time.

The inner end of the crank-pin has a hole, closed by any suitable form of stopper O', for the insertion of lubricant, and the outer or free end B' is enlarged to allow of the insertion of antifriction-balls J' J' and a hardened bearing K, as shown and hereinafter described.

The pedal-pin or spindle D is solid, and instead of having bearing-surfaces formed at each end, as is usual, it has one bearing-surface or shoulder C at its inner or back end and the other C' at or near to its center. Against the said shoulders C C' bear the antifriction-balls J J', held in position by hardened-steel cups or cones M K, which are screwed into the inner and outer ends of the tubular crank-pin, respectively, the outer one being secured and adjusted by a lock-nut L to prevent the cone from moving after adjustment. The pedal-pin D projects out beyond the enlarged outer or free end B' of the tubular crank-pin A to a sufficient extent to take the central hub E of the pedal-frame G G, now to be described.

The central hub E of the pedal-frame G G consists of a portion E, bored out to fit the spindle at that part which it covers, and a cup-like or annular enlargement E', which latter when the parts are brought together fits and projects over the corresponding enlarged outer end B' of the crank-pin A, so as to shield the same, together with its arrangement of ball-bearings J', and thus prevent the access of dirt or dust to the same. The said hub is prevented from turning on the spindle by means of a squared portion I or by an equivalent mechanical device.

The pedal-frame is carried by the central hub E, to which it is connected by means of two lateral arms F F, which may be in one piece with the said hub or fixed rigidly thereto by any suitable means, such as screwing or riveting, and the outer end of the pedal-frame is supported by cross stays or braces H H, secured to the outer end of the pedal-pin or spindle D, preferably by means of a nut d', screwed on the end thereof.

In Figs. 6, 7, and 8 of the accompanying drawings is illustrated a slight modification of that just described in the construction of the central hub and pedal-frame. This arrangement illustrates a simpler and less expensive method of construction. I wish it to be clearly observed and understood that it is not really a different device to that previously described, but practically the same, the invention of this slight modification being prompted mainly by a desire to reproduce these parts in a simpler form without altering the essence of their relative positions and functions. The same description therefore applies to this as to the former construction, the only constructional variations being, as will be seen, that the part E' of the central hub E is rather longer, it reaching to about the center of the hollow crank-pin, and the bearing-sleeve of the hub instead of fitting and bearing entirely around the projecting end of the spindle now only bears on the spindle at one narrow place—namely, by means of the disk s, sweated in by solder or brazing—and the enlarged mouth or annular recess in B' and hardened-steel adjustable cone-bearing and nut K and L are dispensed with.

The oil-cup or arrangement in the end of the crank-pin for receiving and retaining the oil for lubricating the ball-bearing at that end of the spindle or pedal-pin is also, as will be seen, slightly modified from that shown in the preceding figures, it being a ball-valve supported by a spring within a hollow casing.

The pedal-surface may be rat-trap, rubber, or any other known form. The particular type, not being part of this invention, is immaterial, and I reserve the right to use it with any or all.

I claim—

The combination with the driving-crank of a cycle, of the hollow tubular crank-pin, the bearing-cup in the inner end of same, the pedal-pin with its specially-situated central ball-bearing and means for adjusting same, the pedal-frame and the enlarged central overlapping hub, all constructed arranged and operating substantially as and for the purpose described and set forth.

In witness whereof I have hereunto affixed my signature, in presence of two witnesses, this 21st day of September, 1897.

IVOR REES.

Witnesses:
DAVID REES,
EDWARD LEWIS.